(12) United States Patent
Stammler et al.

(10) Patent No.: US 6,839,670 B1
(45) Date of Patent: Jan. 4, 2005

(54) PROCESS FOR AUTOMATIC CONTROL OF ONE OR MORE DEVICES BY VOICE COMMANDS OR BY REAL-TIME VOICE DIALOG AND APPARATUS FOR CARRYING OUT THIS PROCESS

(75) Inventors: Walter Stammler, Ulm (DE); Fritz Class, Roemerstein (DE); Carsten-Uwe Möller, Esslingen (DE); Gerhard Nüssle, Blaustein (DE); Frank Reh, Stuttgart (DE); Burkard Buschkühl, Sindelfingen (DE); Christian Heinrich, Esslingen (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 0 days.

(21) Appl. No.: 09/043,134

(22) PCT Filed: Sep. 9, 1996

(86) PCT No.: PCT/EP96/03939

§ 371 (c)(1),
(2), (4) Date: Sep. 3, 1998

(87) PCT Pub. No.: WO97/10583

PCT Pub. Date: Mar. 20, 1997

(30) Foreign Application Priority Data

Sep. 11, 1995 (DE) ......................................... 195 33 541

(51) Int. Cl.⁷ .............................................. G10L 15/00
(52) U.S. Cl. ........................ 704/251; 704/270; 704/275
(58) Field of Search ................................ 704/246–257, 704/270–275

(56) References Cited

U.S. PATENT DOCUMENTS 4,737,976 A * 4/1988 Borth et al. ................. 455/563
4,751,737 A   6/1988 Gerson et al.
4,856,072 A * 8/1989 Schneider et al. ............. 381/86
5,033,087 A * 7/1991 Bahl et al. .................... 704/245
5,091,947 A * 2/1992 Ariyoshi et al. ............. 704/246
5,125,022 A * 6/1992 Hunt et al. ................... 704/252
5,127,043 A * 6/1992 Hunt et al. ................... 704/252
5,241,619 A   8/1993 Schwartz et al.

(List continued on next page.)

FOREIGN PATENT DOCUMENTS

| DE | 3819178 | 12/1988 | ............. G10L/5/06 |
| DE | 3928049 | 2/1991  | ............. G10L/7/08 |
| DE | 4031638 | 4/1991  | |
| EP | 0535929 | 4/1993  | ............. G10L/5/00 |

OTHER PUBLICATIONS

Furui et al., "Advances in Speech Signal Processing", New York by Marcel Dekker, Inc, 1992, p. 489, 1992.*

(List continued on next page.)

*Primary Examiner*—David D. Knepper
(74) *Attorney, Agent, or Firm*—Venable LLP; Catherine M. Voorhees

(57) ABSTRACT

A speech dialog system wherein a process for automatic control of devices by speech dialog is used applying methods of speech input, speech signal processing and speech recognition, syntatical-grammatical postediting as well as dialog, executive sequencing and interface control, and which is characterized in that syntax and command structures are set during real-time dialog operation; preprocessing, recognition and dialog control are designed for operation in a noise-encumbered environment; no user training is required for recognition of general commands; training of individual users is necessary for recognition of special commands; the input of commands is done in linked form, the number of words used to form a command for speech input being variable; a real-time processing and execution of the speech dialog is established; and the speech input and output is done in the hands-free mode.

57 Claims, 7 Drawing Sheets

U.S. PATENT DOCUMENTS

| | | | | | |
|---|---|---|---|---|---|
| 5,297,183 | A | * | 3/1994 | Bareis et al. | 455/410 |
| 5,303,299 | A | * | 4/1994 | Hunt et al. | 704/246 |
| 5,353,376 | A | * | 10/1994 | Oh et al. | 704/233 |
| 5,475,791 | A | * | 12/1995 | Schalk et al. | 704/233 |
| 5,613,034 | A | * | 3/1997 | Ney et al. | 704/251 |
| 5,893,059 | A | * | 4/1999 | Raman | 704/256 |
| 5,913,192 | A | * | 6/1999 | Parthasarathy et al. | 704/256 |

OTHER PUBLICATIONS

Furui, Sadaoki, "Digital Speech Processing, Synthesis and Recognition", New York by Marcel Dekker, Inc., 1989, p. 164, 1989.*

H. Mangold, *Sprachliche Mensch–Maschine–Kommunikation*, Methoden und Alogrithmen deer Worterkennung, 1992 pp. 2–13.

Shinohara, T., Maeda, N., Asada, H.: Hands Free Voice Recognition Telephone For Automobile In: Proceedings of the ISATA–Conference 1990, pp. 525–545.

Asada, H., Norimatsu, H., Azuma, S., "Speaker–Dependent Voice Recognition Algorithm For Voice Dialing In Automotive Environment", In: Proceedings of the ISATA–Conference 1990, pp. 547–557.

* cited by examiner

PROCESS FOR AUTOMATIC CONTROL OF ONE OR MORE DEVICES BY VOICE COMMANDS OR BY REAL-TIME VOICE DIALOG AND APPARATUS FOR CARRYING OUT THIS PROCESS

BACKGROUND OF THE INVENTION

The invention concerns a process for automatic control of one or more devices by speech control or by real-time speech dialog, by a process for automatic control of one or several devices by speech commands or by speech dialog in real-time operation. The invention further concerns an apparatus for carrying out this process according to the invention by an apparatus for carrying out the above process, in which a speech input/output unit is connected via a speech signal preprocessing unit with a speech recognition unit, which in turn is connected to a sequencing control, a dialog control, and an interface control.

Processes or apparatuses of this kind are generally used in the so-called speech dialog systems or speech-operated systems, e.g. for vehicles, computer-controlled robots, machines, plants etc.

In general, a speech dialog system (SDS) can be reduced to the following components:

A speech recognition system that compares a spoken-in command ("speech command") with other allowed speech commands and decides which command in al l probability was spoken in;

A speech output, which issues the speech commands and signaling sounds necessary for the user control and, if necessary, feeds back the results from the recognizer;

A dialog control and sequencing control to make it clear to the user which type of input is expected, or to check whether the input that occurred is consistent with the query and the momentary status of the application, and to trigger the resulting action during the application (e.g. the device to be controlled);

A control interface as application interface: concealed behind this are hardware and software modules for selecting various actuators or computers, which comprise the application;

A speech-selected application: this can be an order system or an information system, for example, a CAE (computer added engineering) work station or a wheel chair suitable for a handicapped person;

Without being limited to the general usability of the described processes, devices, and sequences, the present description focuses on the speech recognition, the dialog structure, as well as a special application in motor vehicles.

The difficulties for the solutions known so far include:

(a) The necessity for an involved training in order to adapt the system to the characteristic of the respective speaker or an alternating vocabulary. The systems are either completely speaker-independent or completely speaker-dependent or speaker-adaptive, wherein the latter require a training session for each new user. This requires time and greatly reduces the operating comfort if the speakers change frequently. That is the reason why the vocabulary range for traditional systems is small for applications where a frequent change in speakers and a lack of time for the individual speakers must be expected.

b) The insufficient user comfort, which expresses itself in that the vocabulary is limited to a minimum to ensure a high recognition reliability;

the individual words of a command are entered isolated (meaning with pauses in-between);

individual words must be acknowledged to detect errors;

multi-stage dialog hierarchies must be processed to control multiple functions;

a microphone must be held in the hand or a headset (combination of earphones and lip microphone) must be worn;

c) The lack of robustness to operating errors;

to interfering environmental noises.

d) The involved and expensive hardware realization, especially for average and small piece numbers.

It is the object of the invention to provide on the one hand a process, which allows the reliable control or operation of one or several devices by speech commands or by speech dialog in the real-time operation and at the lowest possible expenditure. The object is furthermore to provide a suitable apparatus for carrying out the process to be developed.

SUMMARY OF THE INVENTION

The solution to the above object according to the invention is reflected with respect to the process, by a process for automatic control of one or several devices by speech commands or by speech dialog in real-time operation. The entered speech commands are recognized by a speaker-independent compound-word speech recognizer and a speaker-dependent additional speech recognizer and are classified according to their recognition probability. Recognized, admissible speech commands are checked for their plausibility, and the admissible and plausible speech command with the highest recognition probability is identified as the entered speech command. The functions associated with this speech command for the device or devices, or the responses of the speech dialog system are initiated or generated. The above object is generally achieved according to the invention with respect to the apparatus by carrying out the process according to the invention in which a speech input/output unit is connected via a speech signal preprocessing unit with a speech recognition unit, which in turn is connected to a sequencing control, a dialog control, and an interface control. The speech recognition unit consists of a speaker, an independent compound-word recognizer and a speaker-dependent additional speech recognizer, which are both connected on the output side with a unit for the syntactical-grammatical or semantical postprocessing that is linked to the sequencing control, the dialog control, and the interface control. Advantageous embodiments and modifications of the process according to the invention as well as of the apparatus according to the invention are disclosed.

That fact that a reliable control or operation of devices by speech command or real-time speech dialog is possible with relatively low expenditure must be seen as the essential advantage of the invention.

A further essential advantage must be seen in the fact that the system permits a speech command input or speech dialog control that is for the most part adapted to the natural way of speaking, and that an extensive vocabulary of admissible commands is made available to the speaker for this.

A third advantage must be seen in the fact that the system operates failure-tolerant and, in an advantageous modification of the invention, for example, generally recognizes even non-admissible words, names, sounds or word rearrangements in the speech commands entered by the speaker as such and extracts from these entered speech commands admissible speech commands, which the speaker actually intended.

BRIEF DESCRIPTION OF THE DRAWINGS

The invention is explained in the following in more detail with the aid of the figures, which show.

DETAILED DESCRIPTION OF THE PREFERRED EMBODIMENTS

Figure 1:
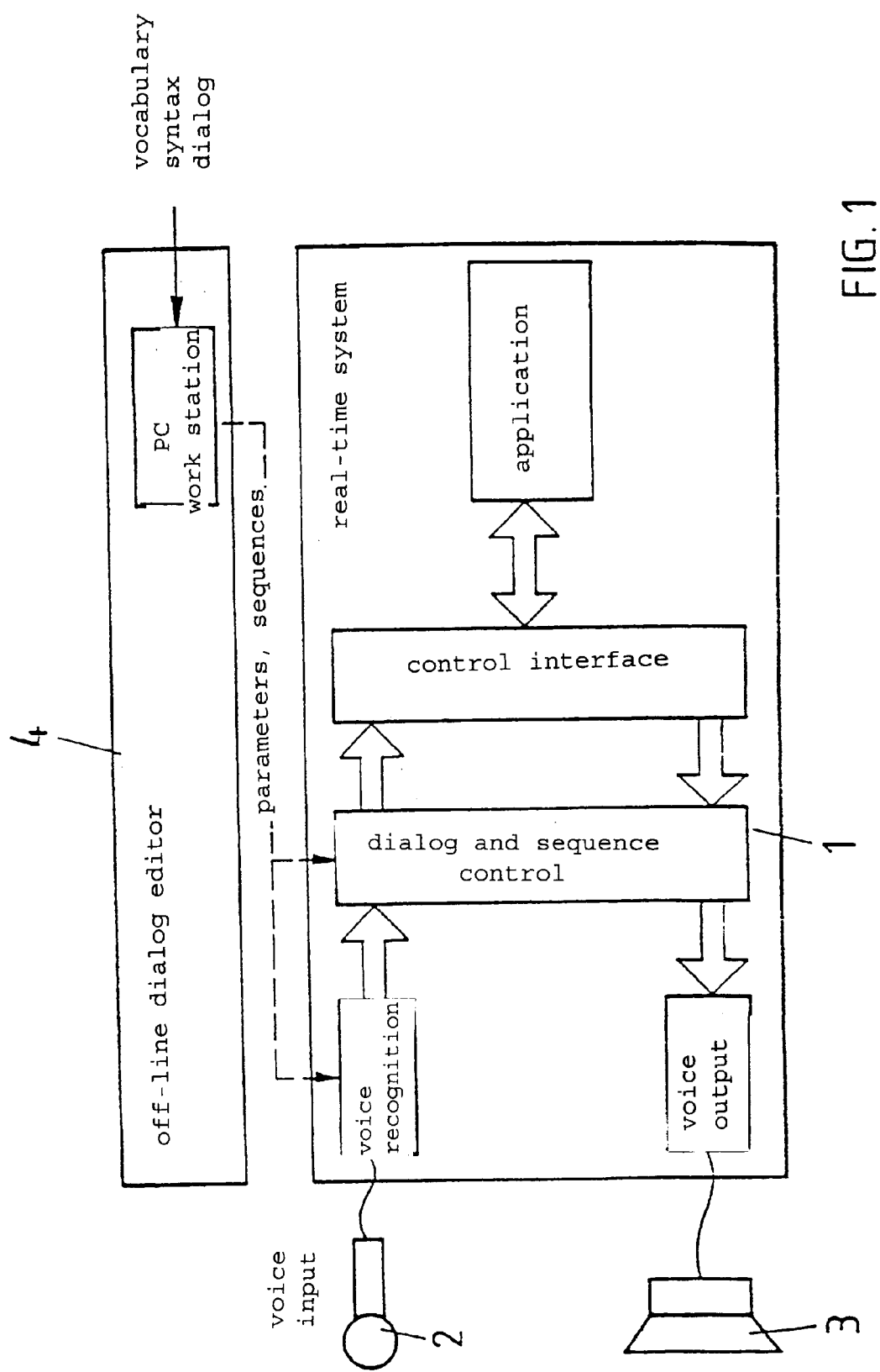
FIG. 1 The block diagram of a preferred embodiment of the apparatus according to the invention for carrying out the process according to the invention ("speech dialog system")

The speech dialog system (VDS) 1 in FIG. 1, described in the following, comprises the components speech input (symbolically represented by a microphone 2), speech recognition 5, dialog control and sequencing control 6, communication interface and control interface 7, speech output 8 (with connected speaker 3), as well as an application 9 (exemplary), meaning a device to be controlled or operated by the SDS. SDS and application together form a speech operating system (SOS), which is operated in real-time ("on-line").

The syntax structure and dialog structure as well as the base commands that are mandatory for all users/speakers are created and fixed "off-line" outside of the SDS or the SOS (example) with the aid of a PC work station 10 and in the "off-line dialog editor mode" 4, and are then transferred in the form of data files to the SDS or the SOS, prior to the start-up and together with the parameters and executive sequencing structures to be specified.

Figure 2:
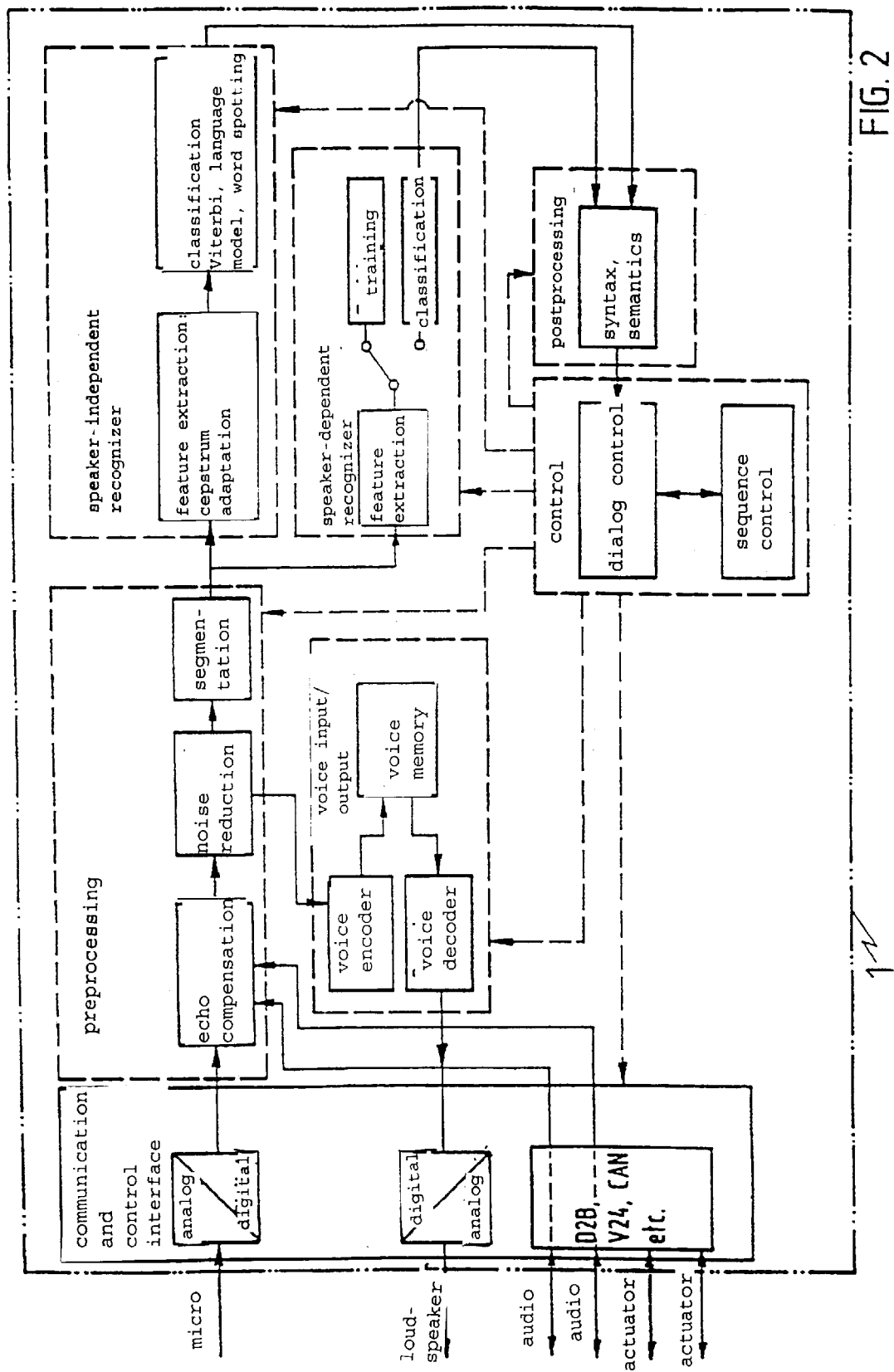
FIG. 2 A detailed illustration of the actual speech dialog system according to FIG. 1.

The SDS 1 in FIG. 1 is shown in detail in FIG. 2. A microphone (not shown) is connected to an analog/digital converter 11, which is connected via devices for the echo compensation 12, the noise reduction 13 and the segmentation 14 to a speaker-independent compound word speech recognizers and to a speaker-dependent speech recognizer 16. The two speech recognizers 15 and 16 are connected on the output side to a postprocessing unit 17 for the syntactical-grammatical and semantical processing of the recognizer output signals. This unit 17, in turn, is connected to the dialog control 18 and the sequencing control 19, which itself forms the control for the SDS and the devices to be controlled by the SDS. A speech input/output unit 20 is furthermore provided, which includes a speech encoder 21, a speech decoder 22 and a speech memory 23.

On the input side, the speech encoder 21 is connected to the device for noise reduction 13 and on the output side to the speech memory 23. The speech memory 23 is connected on the output side to the speech decoder 22, which itself is connected on the output side via a digital/analog converter 24 to a speaker (not shown).

The echo compensation device 12 is connected via interfaces 25 with units/sensors. (not shown), which supply audio signals that may have to be compensated (referred to as "audio" in the figure).

The speaker-independent compound word speech recognizer 15 on the one hand comprises a unit 27 for the feature extraction 25, in which the cepstrum formation takes place and the recognizer 16 is adapted, among other things, to the analog transmission characteristic of the incoming signals and, on the other hand, it has a downstream-connected classification unit 27.

The speaker-dependent speech recognizer 16 also has a unit for the feature extraction 28 on the one hand and a classification unit 29 on the other hand. In place of the classification unit 29, it is also possible to add, with a selector switch 30 a unit 31 for the input of the speaker-specific additional speech commands that must be trained by the speech recognizer in the training phases before, during or after the real-time operation of the SDS. The speaker-dependent recognizer 16 operates, for example, based on the dynamic-time-warping process (DTW), based on which its classification unit 28 determines the intervals between the command to be recognized and the previously-trained reference patterns and identifies the reference pattern with the smallest interval as the command to be recognized. The speaker-dependent recognizer 16 can operate with feature extraction methods such as the ones used in speaker-independent speech recognizers 15 and 16 (cepstrum formation, adaptation, etc.).

On the output side, the two recognizers are connected to the postprocessing unit 17 for the syntactical-grammatical and semantical processing of the recognizer output signals (object and function of this unit are explained later on). The dialog control 18 that is connected to the sequencing control 19 is connected downstream of the postprocessing unit 17 on the output side. Dialog and sequencing controls 18, 19 together form the SDS control unit, which selects the preprocessing, the speech input unit and the speech output unit, the two recognizers, the postprocessing unit, the communication interface and the control interface, as well as the devices to be controlled or operated (the latter via suitable interfaces—as shown in FIG. 2).

The mode of operation for the VDS is explained in more detail in the following.

As previously explained, the SDS contains two different types of speech recognizers for recognizing specified speech commands. The two recognizers can be characterized as follows:

Speaker-independent recognizer: the speaker-independent recognition of words spoken in linked form. This permits the recognition of general control commands, numbers, names, letters, etc., without requiring that the speaker or user trained one or several of the words ahead of time. The input furthermore can be in the compound-word mode, meaning a combination of several words, numbers, names results in a command, which is spoken in linked form, meaning without interruption (e.g. the command: circle with radius one". The classification algorithm is a HMM (Hidden Markov Model) recognizer, which essentially builds on phonemes (sound subunits) and/or whole-word models and composes words or commands from this. The vocabulary and the commands ("syntax structure") constructed from this are fixed ahead of time in the laboratory and are transmitted to the recognizer in the form of data files ("off-line dialog editing mode"). In the real-time operation, the vocabulary and syntax structure of the independent recognizer cannot be modified by the user.

Speaker-dependent recognizer: Speaker-dependent recognition of user-specific/speaker-specific names or functions, which the user/speaker defines and trains. The user/speaker has the option of setting up or editing a personal vocabulary in the form of name lists, function lists, etc. The user/speaker consequently can select his/her personal vocabulary and adapt this vocabulary at any time "on-line," that is in the real-time operation, to his/her needs. The "list of names" can be cited as an example for a use in the telephone ambient field, meaning a list of names of telephone subscribers compiled individually by the user/speaker, wherein during a training phase, the respective name is spoken in once or several times by the user (e.g. "uncle Willi") and a telephone number is assigned to the name via a keyboard input, but preferably via an independent speech recognizer;

at the conclusion of the above training and assigning of the number, the user only supplies a name to the speaker-dependent recognizer "uncle Willi"), but not the coordinated telephone number, which is already known to the system.

The speaker-dependent recognizer is:

in the most simple form designed as a single-word recognizer;

in the more powerful form designed as compound-word recognizer, which is connected without interface to the speaker-independent recognizer (e.g. "call uncle Willi" as a complete command, wherein the word "call" is part of the speaker-independent vocabulary and "uncle Willi" is part of the speaker-dependent vocabulary).

Following the speech recognition, a postprocessing of the results encumbered with a certain recognition probability of the two speech recognizers takes place in the postprocessing unit.

The speaker-independent compound-word speech recognizer, for example, supplies several sentence hypotheses in a sequence, which represents the recognition probabilities. These sentence hypotheses as a rule already take into account the allowed syntax structure. Where this is not the case, non-admissible word sequences are separated out or evaluated based on different criteria within the syntactical postprocessing (FIG. 2), to determine the probability of the therein occurring word combination. The sentence hypotheses generated by the speech recognizers are furthermore checked as to their semantical plausibility, and the hypothesis with the highest probability is then selected.

A correctly recognized speech command is passed on to the dialog control and subsequently leads to an intervention, assigned to this speech command, in the application, wherein the message is transmitted via the control interface. If necessary, the recognized speech command is also (or only) transmitted from the dialog control to the speech output and is issued there.

The here outlined system is characterized in the "on-line" operation by a fixed syntax structure and a fixed command structure as well as by a combination of fixed vocabulary (speaker-independent recognizer) and freely definable vocabulary such as names (speaker-dependent recognizer).

This framework, which initially appears to be inflexible, is a precondition for a high recognition capacity with an extensive vocabulary (at the present time up to several hundred words), e.g., for a noise-encumbered environment, for changing acoustic conditions in the passenger cell, as well as for a variety of speakers. The extensive vocabulary is used to increase the user friendliness by using synonymous words or different variations in the pronunciation. Also, the syntax permits the rearranging of words in the speech command, for example as follows:

"larger radius for left circle"

or—alternative to this—

"For the left circle a larger radius"

wherein these alternatives, however, must be defined from the beginning during the setting up with the "off-line dialog editor."

The here outlined approach to a solution proves to be advantageous, in particular because the compound-word input of commands is more natural and faster than the input of isolated words since, it has turned out in practical operations, that the impartial user has difficulty getting used to speaking isolated words (with clear pauses in-between) in order to enter a multiword command (that is why the acceptance of such systems is clearly lower);

the input of, for example, number columns or letter columns in a compound form is easier and requires less concentration than the individual input;

the dialog control is more natural, for example, as not every individual number must be acknowledged in number columns, but only the entered number block;

owing to the vocabulary of, for example, up to several hundred words, a plurality of functions for each language can be operated, which previously required a manual operation;

the number of manual switching elements can be reduced or the hands can otherwise be used during the speech input, e.g., for the quality control of motors.

The user comfort is further increased in the present system through the advantageous use of hands-free microphones in place of (or to complement) headsets (earphones and lip microphone) or a hand-held microphone. However, the use of a hands-free microphone generally requires a powerful noise reduction (FIG. 2) and, if necessary, an echo compensation of signals, e.g., coming from the dialog speaker or other speakers. These measures may also be necessary when using a headset or hand-held microphone, depending on the application or noise level.

The echo compensation in particular permits the user/speaker to interrupt the speech output, meaning to address the recognizer while the speech output is active.

The vocabulary and the commands furthermore can be changed at any time, in the laboratory via "off-line dialog editor," without requiring a new training with a plurality of speakers for the new words of the speaker-independent recognizer. The reason for this is that the data bank for speaker-independent phonemes and/or speaker-independent whole-word models exists in the laboratory and that with the existing developmental environment, new words and commands can be generated without problems from these phonemes or whole-word models. In the final analysis, a command or vocabulary change is aimed at transferring the new parameters and data, computed in the laboratory with the development system, as data file to the speaker-independent "real-time recognizer" and to store them in the memory there.

It is possible with the aid of the SDS to operate functions within the computer, of which the SDS is an integral component, as well as to operate external devices. In addition to a PCMCIA (Personal Computer Memory Card International Association Standard) interface, the SDS, for example, also has interfaces that are accessible to external devices. These include, for example, a V.24 interface, (German serial interface standard corresponding to t U.S. Standard RS232)an optical data control bus, a CAN (Controller Area Network) interface, etc. The SDS can be provided optionally with additional interfaces.

The SDS is preferably activated by actuating a push-to-talk key (PTT key) or through a defined key word. The system is shut down by entering a respective speech command ("termination command") at defined locations in the dialog or at any time by actuating the PTT key or an escape key or automatically through the internal sequencing control, if, following a time interval that is specified by the SDS or is adjusted adaptively to the respective user and/or following a query by the SDS, no speech input has taken place or the dialog selected by the user has been completed as planned(e.g, the desired telephone number has been transmitted to the telephone for making a connection). In a low-noise environment, the SDS can also be activated continuously.

Description of the Sequence

It must be stressed at this point that the SDS in FIG. 2 is only one example for a speech dialog system possible in accordance with the invention. The configuration of the interfaces for the data input or the data output or the control of the connected components is also shown only as an example here.

The functional blocks shown in FIG. 2 are explained in more detail in the following:

1. Echo compensation

The digitized speaker signals, e.g., from the speech output or a turned-on radio, are subtracted via the echo compensation and via adaptive filter algorithms from the microphone signal. The filter algorithms form the echo path from the speaker to the microphone.

2. Noise Reduction

The noise reduction makes it possible to differentiate stationary or quasi-stationary environmental noises from the digitized speech signal and to subtract these from the speech signal. Noises of this type are, for example, driving noises in a motor vehicle (MV), environmental noises inside laboratories and offices such as fan noises, or machine noises in factory buildings.

3. Segmentation

Figure 3:
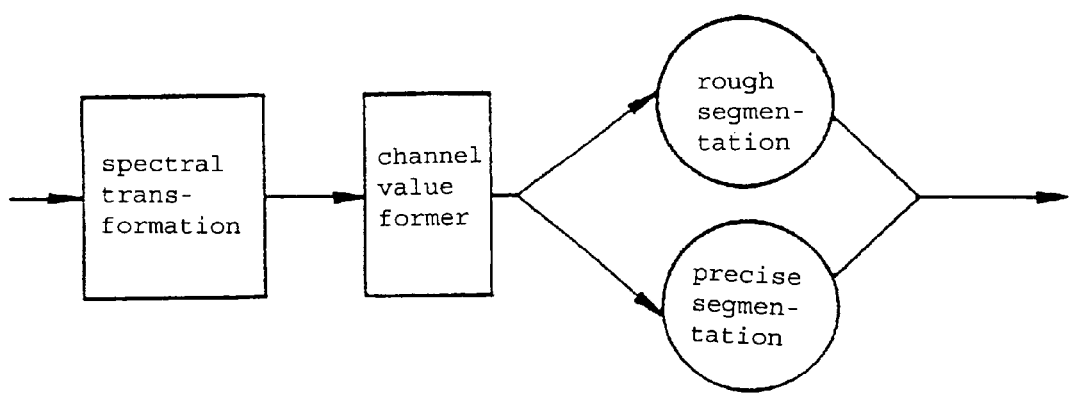
FIG. 3 The flow diagram for a preferred embodiment showing the segmentation of the input speech commands for a speech dialog system according to FIG. 2.

As shown in FIG. 3, the segmentation is based on spectrally transformed data. For this, the signals are initially combined block by block to form so-called "frames" and are converted to the frequency range with the aid of a Fast Fourier Transformation (FFT) Block S). Through forming an amount and weighting with an audio-related MEL filter, meaning a filter that copies the melodic perception of the sound level, for which an audio-related division of the speech range (~200 Hz to 6~kHz) into individual frequency ranges ("channels") is carried out (Block C), the spectral values are combined to form channel vectors, which indicate the capacity in the various frequency bands. This is followed by a rough segmentation (Block RS) that is permanently active and roughly detects the beginning and the end of the command, as well as a precise segmentation (Block PS), which subsequently determines the exact limits.

4. Feature extraction

The feature extractor computes feature vectors over several stages from the digitized and segmented speech signals and determines the associated standardized energy value. For this, the channel vectors are transformed in the speaker-independent recognizer with a discrete cosine transformation (DCT) to cepstral vectors. In addition, the energy of the signal is calculated and standardized. Parallel to this, the mean of the cepstral values is calculated continuously, with the goal of adapting the recognizer to the momentary speaker as well as to the transmission characteristics, e.g., of the microphone and the channel (speaker→microphone). The cepstral vectors are freed of this adapted mean value and are combined with the previously calculated standardized energy to so-called CMF vectors (cepstral coefficients mean value free).

5. Classification of the speaker-independent compound-word speech recognizer.

5.1 Hidden-Markov-Model (HMM)

Figure 4:
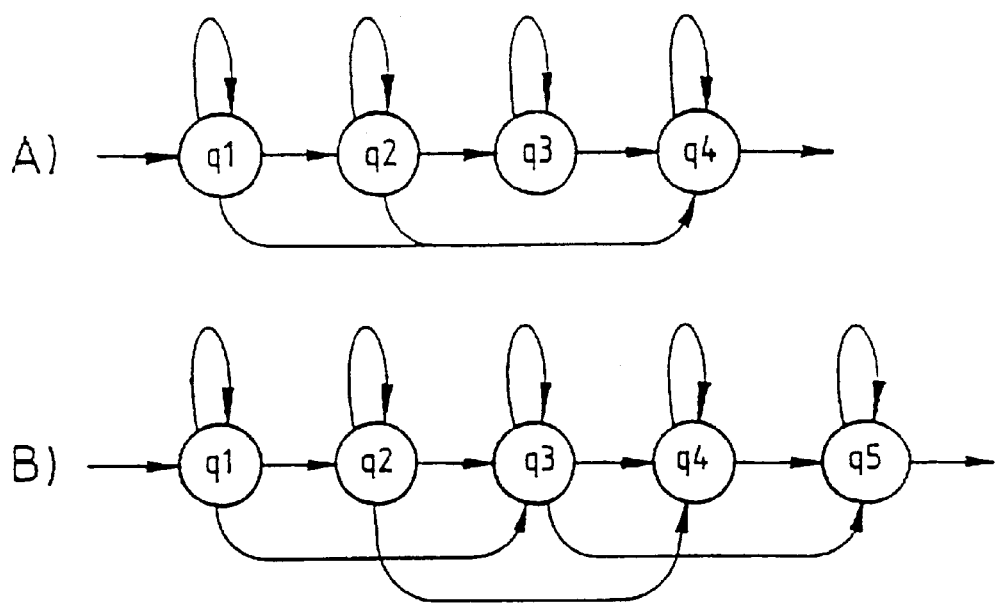
FIGS. 4 and 5 Exemplary embodiments of Hidden-Markov models.

A Hidden-Markov-Model is a collection of states connected to each other by transitions (FIG. 4).

Each transition from a state qi to another state qj is described by a so-called transition probability. A vector of so-called emission probabilities with length M is assigned to each node (state). The connection to the physical world is made via these emission probabilities. The model idea goes so far as to state that in a specific state $q_i$, a symbol differing from M is "emitted" in accordance with the emission probability related to the state. The symbols represent the feature vectors.

The sequence of "emitted" symbols generated by the model is visible. However, the concrete sequence of the states, passed through within the model, is not visible (English: "hidden").

A Hidden-Markov-Model is defined by the following quantities:

T number of symbols
t point in time for an observed symbol, t–1 . . . T
N number of states (nodes) of the model
M number of possible symbols (=code book value)
Q states of the model {ql, q2, . . . qn}
V number of symbols that are possible
A transition probability from one state to another
B probability for an output symbol in a model state (emission probability)
n probability for the initial state of the model (during the HMM training).

Output symbols can be generated with the aid of this model and using the probability distributions A and B.

5.2 Design of the phoneme-based HMM2 recognizer

Figure 5:
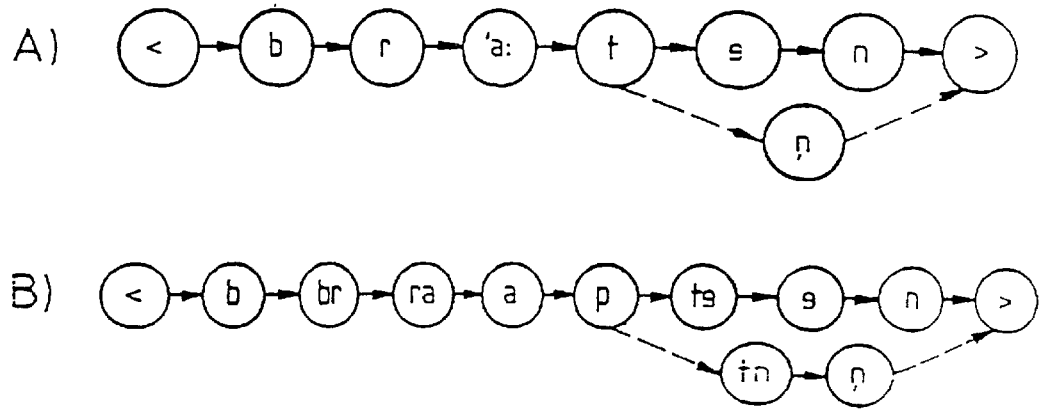

The word recognition for a speech recognition system with a larger vocabulary usefully is not based on whole words, but on phonetic word subunits. Such a word subunit is, for example, a phoneme, a diphone (double phoneme) or a phoneme transition. A word to be recognized is then represented by the linking of the respective models for word subunits. FIG. 5 shows such an example of a representation with linked Hidden-Markov-Models (HMM), on the one hand by the standard phonetic description of the word German Word "braten" (frying") (FIG. 5*a*) and on the other hand by the phonetic description of the pronunciation variants (FIG. 5b). When setting up the system, these word subunits are trained with random samples from many speakers and form the data base on which the "off-line dialog editor" builds. This concept with word subunits has the advantage that new words can be incorporated relatively easily into the existing dictionary since the parameters for the word subunits are already known. Theoretically, an optionally large vocabulary can be recognized with this recognizer. In practical operations, however, limits will be encountered owing to a limited computing power and the recognition capacity necessary for the respective application.

The classification is based on the so-called Viterbi algorithm, which is used to compute the probability of each word for the arriving symbol sequence, wherein a word here must be understood as a linking of various phonemes. The Viterbi algorithm is complemented by a word sequence statistic ("language model"), meaning the multiword commands specified in the "off-line dialog editor" supply the allowed word combinations. In the extreme case, the classification also includes the recognizing and separating out of filler phonemes (ah, hm, pauses, throat clearing sound) or garbage words ("non-words"). Garbage words are language complements, which are added by the speaker—unnecessarily—to the actual speech commands, but which are not part of the vocabularies of the speech recognizer. For example, the speaker can further expand the command "circle with radius one" by using terms such as "I now would like to have a . . . " or "please a . . . " Depending on the application or the scope of the necessary vocabulary, these phoneme-based Hidden-Markov-Models can also be complemented by or expanded with Hidden-Markov-Models based on whole words.

6. Speaker-dependent recognizer

The speaker-dependent recognition is based on the same preprocessing as is used for the speaker-independent recognizer. Different approaches to a solution are known from the literature (e.g. "dynamic time warping" (DTW), neural net classifiers), which permit a real-time training. Above all, this concerns individual word recognizers, wherein the dynamic time warping process is preferably used in this case.

In order to increase the user friendliness, the SDS described here uses a combination of a speaker-independent (compare point 5) and a speaker-dependent recognizer in the compound word mode ("call Gloria," "new target uncle Willi," "show function oblique ellipse"), wherein the words "Gloria," "uncle Willi," "oblique ellipse" were selected freely by the user during the training and were recorded in respective lists, together with the associated telephone numbers/target addresses/function descriptions. The advantage of this approach to a solution is that one to two (or if necessary even more) dialog steps are saved.

7. Postprocessing: check of syntax and semantics

The SDS includes an efficient postprocessing of the results, supplied by the speech recognizers. This includes a check of the syntax to detect whether the determined sentence hypotheses correspond to the a priori fixed configuration of the speech command ("syntax"). If this is not the case, the respective hypotheses are discarded. In individual cases, this syntactical analysis can be partially or totally integrated into the recognizer itself, e.g., in that the syntax is already taken into account in the decision trees of the classifier.

The sentence hypotheses supplied by the speech recognizer are also checked as to their meaning and plausibility.

Following this plausibility check, the active sentence hypothesis is either transmitted to the dialog control or rejected.

In case of a rejection, the next probable hypothesis of the speech recognizer is accepted and treated the same way. In case of a syntactically correct and plausible command, this command is transmitted together with the description of the meaning to the dialog control.

8. Dialog and sequence control

The dialog control reacts to the recognized sentence and determines the functions to be carried out. For example, it determines:

which repetition requests, information or queries are issued to the user;

which actuators are to be addressed in what way;

which system modules are active (speaker-independent recognizer, training);

which partial-word vocabularies (partial vocabularies) are active for the response expected to come next (e.g. numbers only).

The dialog control furthermore maintains a general view of the application status, as far as this is communicated to the VDS. Underlying the dialog control is the sequence control, which controls the individual processes logically and temporally.

9. Interface for communication and control

This is where the communication with the connected peripheral devices, including the devices to be operated, takes place. Various interfaces are available for this. However, not all these interfaces are generally required by the SDS. The options named in FIG. 2 are only examples of an implementation. The interface for communication and control among other things also handles the speech input and output, e.g. via the A/D or D/A converter.

10. Speech input/output

The speech input/output is composed of a "speech signal compression module" (="speech encoder"), which removes the redundancy or irrelevancy from the digitized speech signal and thus can store a speech signal with a defined length in a considerably smaller memory than directly following the A/D conversion. The compressed information is stored in a speech memory and is regenerated for the output in the "speech decoder," so that the originally input word can be heard once more. Given the presently available encoding and decoding processes, the loss in quality during the playback, which may occur in this case, is within a justifiable framework.

A number of commands, auxiliary texts or instructions are stored from the start in the speech memory for the dialog control ("off-line dialog editor"), which are designed to aid the user during the operation or to supply him/her with information from the application side.

Furthermore, the speech encoding is activated during the training for the speaker-dependent recognizer since the name spoken in by the user is also stored in the speech memory. By listening to the name list or the function list, the user can be informed acoustically at any time of the content, that is to say the individual names or functions.

With respect to the algorithm for the speech encoding and decoding, it is possible to use processes, for example, which are known from the speech transmission under the catchword "source coding" and which are implemented with software on a programmable processor.

Figure 6:
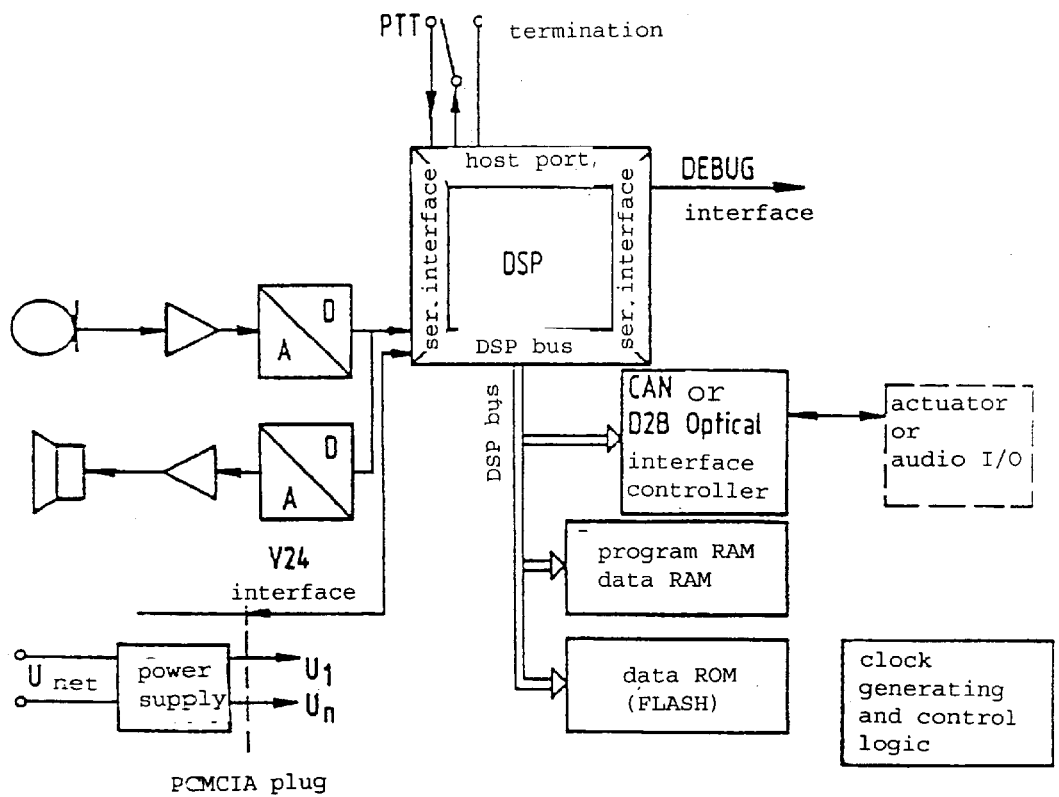
FIG. 6 The hardware configuration of a preferred embodiment of the speech dialog system according to FIG. 2.

FIG. 6 shows an example of a possible hardware configuration of the SDS according to FIG. 2. The configuration of the individual function blocks as well as the interfaces to the data input and the data output or for the control of the connected components is shown only as an example in this case. The here assumed active stock of words (vocabulary), for speaker-independently spoken words, for example, can comprise several hundred words.

The digital signal processor (DSP) is a commercially available, programmable processor, which is distinguished from a microprocessor by having a different bus architecture (e.g., Harvard architecture instead of Von-Neumann architecture), special "on-chip" hardware arithmetic logic units (multipliers/accumulators/shifters, etc.) and I/O functionalities, which are necessary for the real-time digital signal processing. Powerful RISC processors increasingly offer similar functionalities as the DSP's and, if necessary, can replace these.

The digital signal processor shown here (or another microprocessor with comparable capacity) can process all functions shown in FIG. 2 with the aid of software or integrated hardware, with the exception of special interface control functions. With the DSP's that are presently available commercially and the concept presented here, vocabularies of several hundred words (an example) can be realized, wherein it is assumed that this vocabulary is available completely as "active vocabulary" and is not reduced considerably through forming partial vocabularies. In the event that partial vocabularies are formed, each of these can comprise the aforementioned size.

The use of the hardware structure according to FIG. 6 and especially omitting the additional special components for the recognition and/or the dialog control, sequencing control, speech encoding and interface protocol processing, offers the chance of a realization with compact, cost-effective hardware with low current consumption. In the future, DSP's will have higher arithmetic capacities and higher storage capacities owing to the technological improvements, and it will be possible to address larger external storage areas, so that more extensive vocabularies or more powerful algorithms can be realized.

The SDS is activated by the "push-to-talk" key (PTT) connected to the DSP. Actuating this key causes the control software to start the recognition process. In detail, the following additional hardware modules exist besides the DSP:

A/D and D/A converter

Via a connected A/D converter 61 and a D/A converter 62:
the microphone signal and, if necessary, the speaker signals are digitized and transmitted to the DSP for further processing;
the digitized speech data for the speech output/dialog control are converted back into an analog signal, are amplified and transmitted to a suitable playback medium (e.g., a speaker).

D2B Optical

This is an optical bus system 63 having a controller 63', which can be used to control diverse audio devices and information devices (e.g. car radio and CD changer, car telephone and navigation equipment, etc.). This bus not only transmits control data, but also audio data. In the extreme case (meaning if it is used to transmit microphone and speaker signals), the A/D and D/A conversion in the VDS can be omitted.

CAN Bus

This is a bus system, which can be used to control information devices and actuators in the motor vehicle. As a rule, an audio transmission is not possible.

V.24 Interface

This interface 67 can be used to control diverse peripheral devices. The SDS software can furthermore be updated via this interface. A respective vocabulary or a corresponding language (e.g., German, English, French . . . ) can thus be loaded in.

PCMCIA Interface

In addition to communicating with a desktop or portable computer, this interface 64 also functions to supply voltage to the SDS. Several of the above-listed functions can be combined here. In addition to the electrical qualities, this interface can also determine the mechanical dimensions of the SDS. These can be selected, for example, such that the SDS can be plugged into a PCMCIA port of a desktop or portable computer.

Memory

The memory (data/program RAM 65 and ROM 66) connected to the DSP serves as data and program storage for the DSP. It furthermore includes the specific classification models and, if necessary, the reference patterns for the two speech recognizers and the fixed texts for the dialog control and the user prompting. The user-specific information (address list, data list) is filed in a FLASH memory or a battery-buffered memory.

The hardware configuration outlined here, in particular with respect to the interfaces, depends strongly on the respective application or the special client requirements and is described here in examples for several application cases. The selection of interfaces can be totally different for other applications (e.g. when linking it to a PC or a work station or when using it in portable telephones). The A/D and the D/A converters can also be integrated on the DSP already.

Function Description Using the Example of a Speech-operated Car Telephone

The dialog sequences are described in the following with the example of a speech-controlled telephone control (e.g., in a motor vehicle).

This example can be expanded to the selecting of telephone and radio and/or CD and/or navigation in the motor vehicle or the operation of a CAE work station or the like. Characteristic for each of these examples is:

The speaker-independent recognition of multiword commands, as well as letter columns and number columns.

The speaker-dependent input of a freely selected name or function word, previously trained by the user, which is associated with a function, a number code (e.g., telephone number of a telephone directory or station frequency of a radio station list) or a letter combination (e.g., target location for navigation systems).

In the process of defining the association, the user enters the function, letter combination or number combination in the speaker-independent compound-word mode (wherein the function, the letters, the numbers must be included in the admissible vocabulary, meaning they must be initially fixed with the "off-line dialog editor").

This name selection is always linked to the management of a corresponding list of different names or function words of the same user (telephone directory, station list, target location list). This list can be expanded, deleted, polled or corrected.

Figure 7:
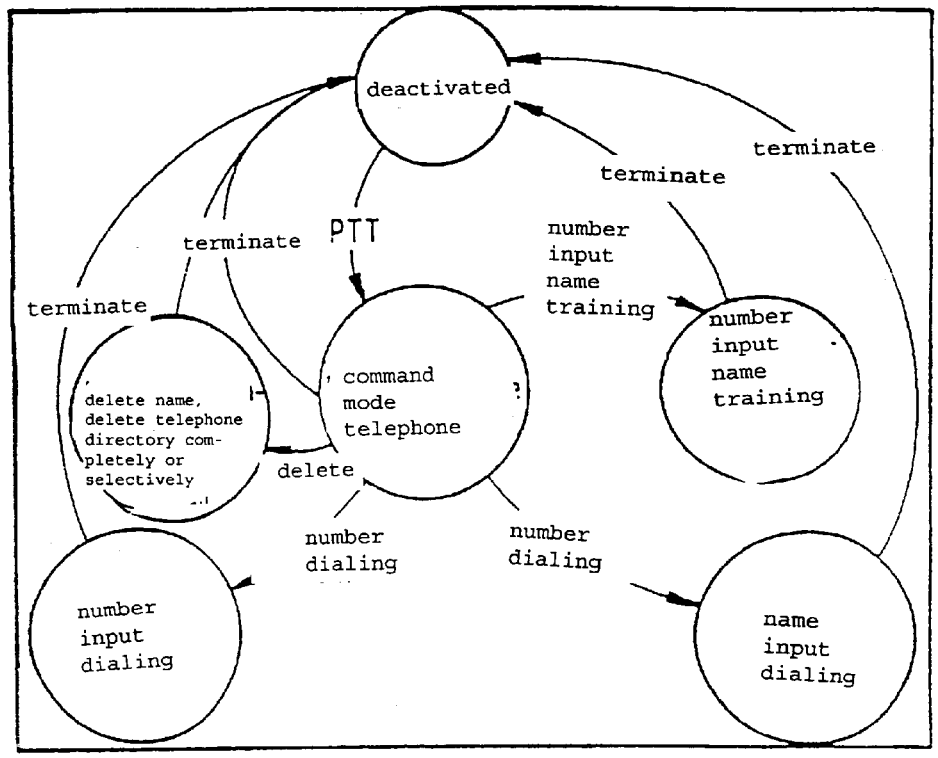
FIG. 7 The status diagram for the application of the speech dialog system according to FIG. 2, for a speech-controlled telephone operation.

Diagram of SDS States (FIG. 7)

When operating the telephone via the speech input, the SDS assumes different states, some which are shown as examples in FIG. 7 (deactivated state 71; command mode "telephone 72;" number input or number dialing 73, as well as input or selection of name in connection with the selection function 74; number input or name training in connection with the storage function 75; name deleting or complete or selective deleting of telephone directory in connection with the delete function). The transitions are controlled by issuing speech commands ("number dialing," "name selection," "name storage," "number storage," "termination," "deleting"), wherein the SDS is activated by actuating the PTT key. A dialog termination occurs, for example, through the input of a special termination command ("terminate") or by activating an escape key.

Operating State "Deactivated"

The speech dialog system is not ready for recognition when in this state. However, it is advantageous if parts of the signal processing software are continuously active (noise reduction, echo compensation) in order to update the noise and echo state permanently.

Figure 8:
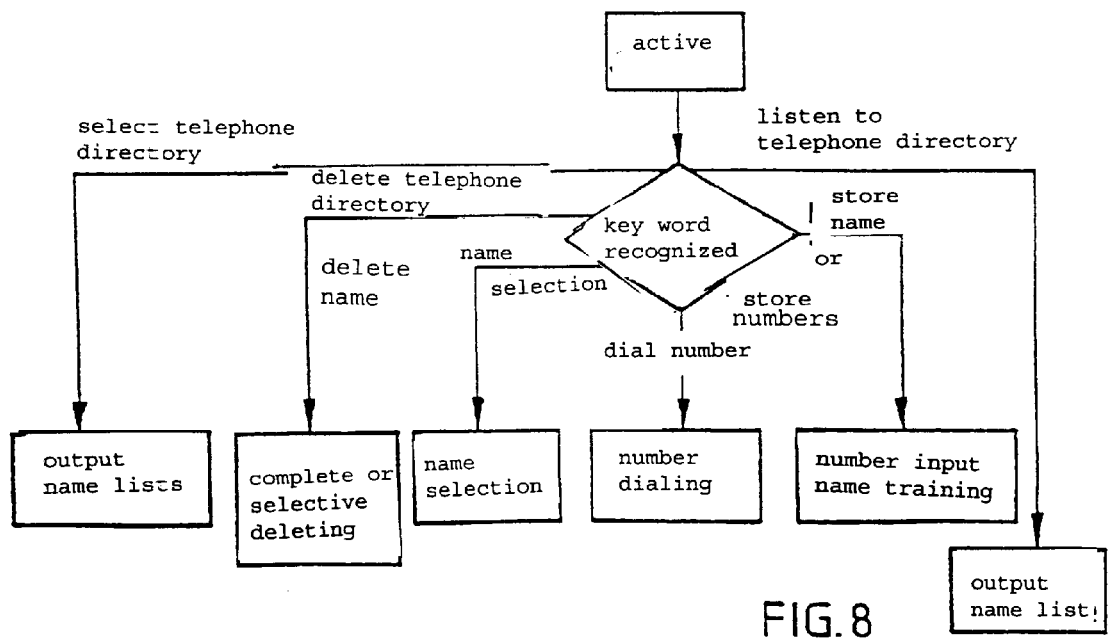
FIG. 8 The flow diagram for operating a telephone according to FIG. 7.

Operating State "Active" (FIG. 8)

The speech dialog system has been activated (81) with the PTT key and is now awaiting the commands, which are allowed for the further control of the peripheral devices (telephone). The function sequences of the operating state "active" are shown in FIG. 8 in the form of a flow diagram (as example), that is to say for the functions "select telephone directory (82)," "delete telephone directory (83)," "delete name (84)," "select name (85)," "dial number (86)," "store name (87)," "store number," "listen to telephone directory (88)," and the associated actions and reactions (output of name lists, complete or selective deleting, name selection or number selection, number input or name training). Of course, these functions can be complemented or expanded if necessary, or can be replaced partially or totally by other functions. It must be mentioned in general in this connection that the activated SDS can be deactivated at any time, meaning also during one of the function sequences explained further in the following, with the result that the function sequence, which may not be complete, is terminated or interrupted. The SDS can be deactivated, for example, at any time by actuating, if necessary, the existing escape key or the input of a special termination command (e.g. "stop," "terminate," or the like) at defined locations in the dialog.

Figure 9:
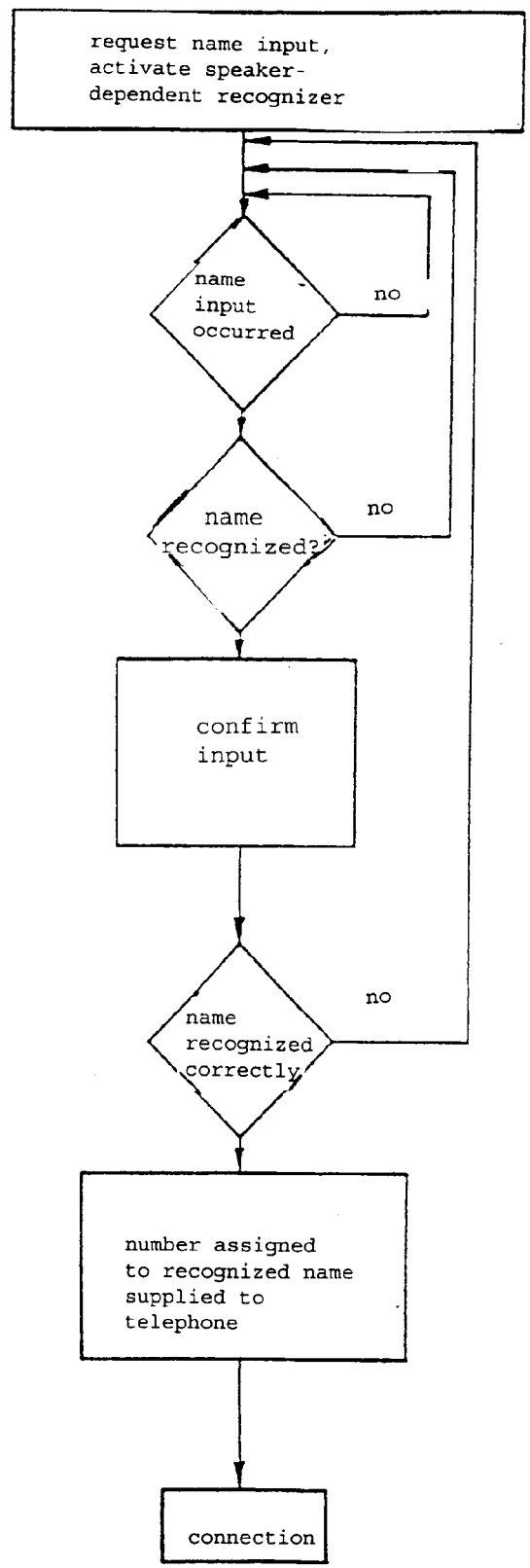
FIGS. 9 and 10 The flow diagram for the function "name selection" (FIG. 9) or "number dialing" (FIG. 10) when operating a telephone according to the flow diagram based on FIG. 8.

Operating State "Name Selection" (FIG. 9)

This state presumes the correct recognition of the respective speech command "name selection" or "telephone name selection" or the like. It is possible in this state to dial a telephone number by entering a name. For this, a switch to a speaker-dependent speech recognizer is made.

The speech dialog system requests the input of a name. This name is acknowledged for the user. The speech dialog system then switches again to the speaker-independent recognizer. If the name was recognized correctly, the telephone number assigned to the name is transmitted to the telephone where the connection to the respective telephone subscriber is made. If the name was misunderstood, a dialing of the telephone number can be prevented through a termination function (e.g., by activating the escape key). Alternatively, a request for repetition from the SDS is conceivable, to determine whether the action/function assigned to the speech command must be carried out or not. Depending on the effort or the storage capacity, the telephone directory can comprise, for example, 50 or more stored names. The function sequences for the operating state "name selection" are shown in the form of a flow diagram in FIG. 9.

Figure 10:
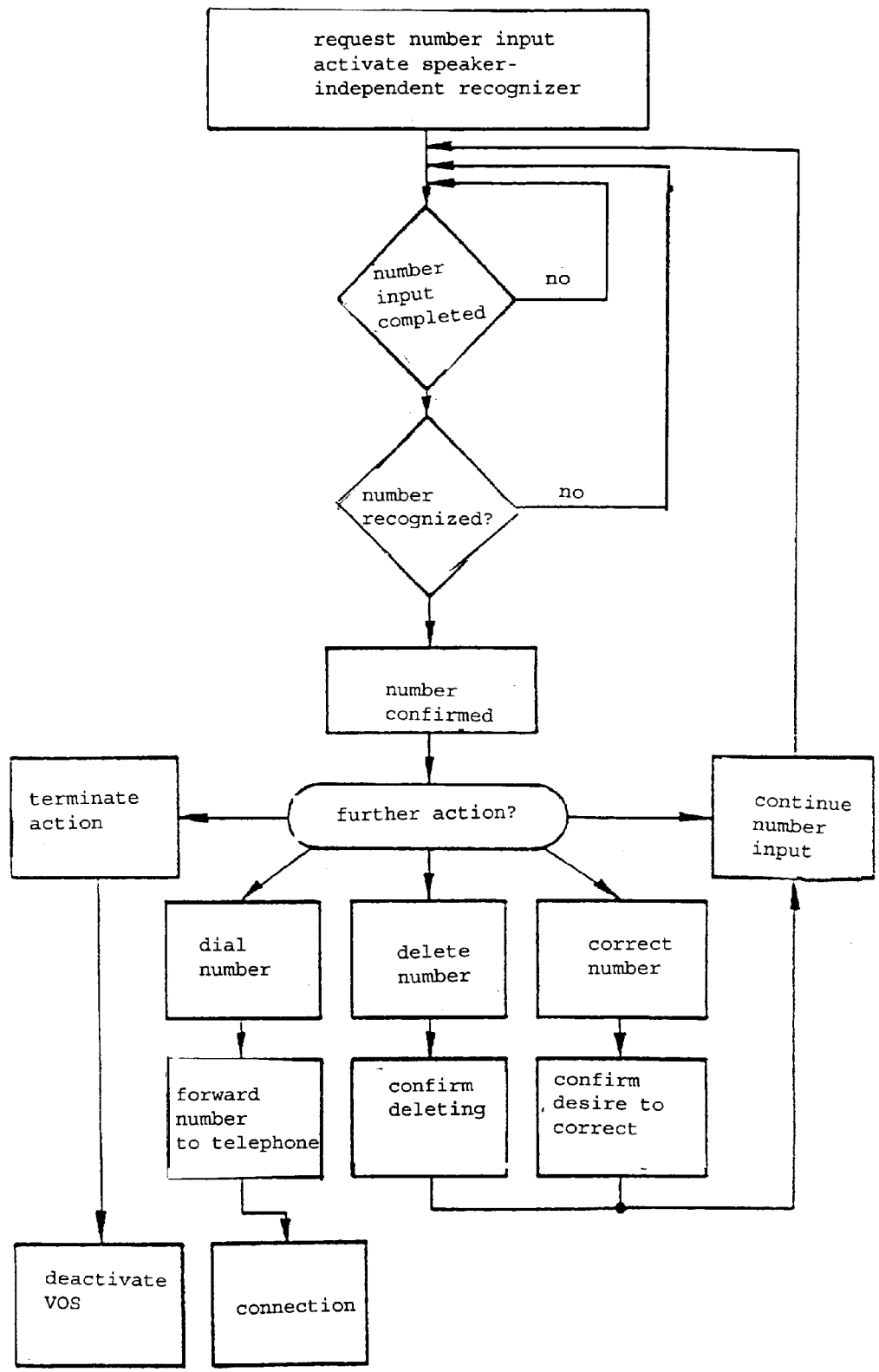

Operating State "Number Dialing" (FIG. 10)

This state presumes a correct recognition of the respective speech command (e.g., "number dialing" or the like). A telephone number is dialed in this state by entering a number sequence. The input is made in a linked form (if necessary in blocks) and speaker-independent. In this operating state, the SDS requests the input of a number. The user then enters the number either as a whole or in individual blocks as a speech command. The entered numbers or the respectively entered number block is acknowledged for the user following the input of the respective speech command. Following the request "dialing," the number is transmitted to the telephone where the connection is made to the respective telephone subscriber. If the number was misunderstood, then the number can be corrected or deleted with an error function, or the speech operation can be terminated via a termination function, for example, with a command "terminate," that is to say, the SDS can be deactivated. The function sequences of the operating state "number dialing" are shown in the form of a flow diagram in FIG. 10.

Operating State "Connection"

The telephone connection to the desired telephone subscriber is established. The speech recognition unit is deactivated in this state. The telephone conversation is ended, for example, by using the escape key.

Operating State "Store Number/store Names"

After the SDS has requested that the user/speaker input the numbers, following the speech command "store number" or "store name," and after the user has spoken those in (compare operating state "number dialing"), the command "storing" or a comparable command is input in place of the command "dialing." The telephone number is then stored. The SDS subsequently requests that the user speak in the associated name and makes sure that the name input is repeated once or several times to improve the training result. Following this repetition, the dialogue is ended. In completion, it must be said that the initial number input can be controlled with dialog commands such as "terminating," or "termination," "repeat," "correct" or "correction," "error" etc.

Operating State "Delete Telephone Directory/delete Name"

In connection with the "telephone directory" (list of all trained names and associated telephone numbers), a number of editing functions are defined, which increase the system comfort for the user, for example:

Deleting of Telephone Directory

A complete or selective deleting, wherein an accidental deleting caused by recognition errors is avoided through a repetition request by SDS ("are you sure?") prior to the final deleting and, if necessary, an output of the specific name.

Name Deleting

The SDS urges the user to speak in the name to be deleted. The name is then repeated by the SDS. With the question "are you sure?" the user is subsequently urged to confirm the deleting operation:

The input of the speech command "yes" triggers the deleting of the name from the telephone directory. Any other word input as a speech command will end the dialog.

Operating State "Listen to Telephone Directory"

The SDS announces the content of the total telephone directory. An activation of the PTT key or the input of the termination command terminates the announcement or the dialog.

Operating State "Telephone Directory Dialing"

The SDS announces the content of the complete telephone directory. If a termination or dialing command is issued following the announcement of the desired name, or if the PTT key is actuated, then the selected name is announced once more and the following question is asked: "should this number be dialed?"

The input of the speech command "yes" triggers the dialing operation, meaning the connection is established.

A "no" causes the SDS to continue the announcement of the telephone directory. The speech command "termination," "terminate," or the like or an actuation of the escape key ends the announcement or the dialog.

The two last-named functions "listen to telephone directory" and "telephone directory dialing" can also be combined to form a single function. This can be done, for example, if the PTT key is actuated following the relevant name during the function "listen to telephone directory," and if the SDS initiates the dialing operation, e.g., following the announcement "the name 'uncle Willi' is selected."

By taking into account further applications, the characteristics of the above-described SDS can be summarized as follows:

Used is a process for the automatic control and/or operation of one or several devices for each speech command or each speech dialog in the real-time operation, in which processes for the speech output, speech signal preprocessing and speech recognition, syntactical-grammatical postprocessing as well as dialog control, sequence control, and interface control are used. In its basic version, the process is characterized in the "on-line" operation by a fixed syntax structure and a fixed command structure, as well as a combination of fixed vocabulary (speaker-independent recognizer) and freely definable vocabulary, e.g. names or function values (speaker-dependent recognizer). In advantageous embodiments and modifications, it can be characterized through a series of features, based on which it is provided that:

Syntax structure and command structure are fixed during the real-time operation;

Preprocessing, recognition and dialog control are configured for the operation in a noise-encumbered environment;

No user training is required ("speaker-independence") for the recognition of general commands, names or data;

Training is necessary for the recognition of specific names, data or commands of individual users ("speaker-dependence" for user-specific names or function words);

The input of commands, names or data is preferably done in a linked form, wherein the number of words used to form a command for the speech input varies, meaning that not only one or two word commands, but also three, four or more word commands can be defined;

A real-time processing and executing of the speech dialog is ensured;

The speech input and the speech output occur not or not only via a hand-held device, earphones, headset or the like, but preferably in the hands-free operation;

The speaker echos recorded during the hands-free talking into the microphone are electrically compensated (echo compensation) to permit a simultaneous operation of speech input and speaker (e.g. for a speech output, ready signals, etc.).

There is a continuous automatic adaptation to the analog transmission characteristic (acoustics, microphone and amplifier characteristic, speaker characteristic) during the operation;

In the "off-line dialog editor," the syntax structure, the dialog structure, the vocabulary and the pronunciation variants for the recognizer can be reconfigured and fixed, without this requiring additional or new speech recordings for the independent recognizer;

The speech range for the speech output is fixed in the off-line dialog editor, wherein
   a) the registered speech signals are subjected to a digital speech data compression ("speech encoding"), are subsequently stored, and a corresponding speech decoding takes place during the real-time operation and following the reading-out of the memory, or
   b) the speech content was previously stored in the form of text and is subjected during the real-time speech output operation to a "text-to speech synthesis."

The word order can be changed by interchanging individual words in a command;

Predetermined synonymous words can be used;

The same function can be realized through commands with a different number of words (e.g., through two-word or three-word commands);

Additional words or phoneme units can be added to the useful vocabulary ("non-words," "garbage words") or word spotting approaches can be used to recognize and subsequently remove interjections such as "ah," "hm," "please," or other commands that do not belong to the vocabulary;

The dialog structure is distinguished by the following characteristics:
   a flat hierarchy, meaning a few hierarchy planes, preferably one or two selection planes;
   integrating of "ellipses," that is to say omitting the repeating of complete command sentences with several command words and instead a limiting to short commands, e.g., "further," "higher," "stronger," wherein the system knows from the respectively preceding command what this statement refers to;
   including of the help menu or the information menu;
   including of repetition requests from the SDS in case of unsure decisions by the recognizer ("what do you mean," "please repeat," "and further");
   including of speech outputs in order to ensure that the recognition is increased by stimulating certain manners of speaking (e.g. by the query: "please louder");

The speech recognition is activated by a one-time actuation of a push-to-talk key (PTT key) and this is acknowledged acoustically (e.g. with a beeping sound) to indicate that the input can now take place;

It is not necessary to actuate the PTT key if a speech input is required following a repetition request by the speech output, wherein the PTT key
   either performs or comprises multiple functions, for example during the telephoning ("hanging up the receiver," "lifting off the receiver") or during the restart of the speech dialog system or the termination of a telephone dialing operation;
   or is complemented by additional switches, e.g., permitting a restart or the termination of a function/action ("escape key"); if necessary, the PTT and the termination function can be integrated into one single lever (e.g. triggering the PTT function by pulling the lever toward oneself; triggering the termination function by pushing the lever away);

The dialogue system has one or more of the following performance features:
   the specific (e.g., trained) commands, data, names, or parameters of the various users are stored on demand for a later use;

the commands or names trained by the speaker are not only supplied to the recognition system during the training phase, but are also recorded as to their time history, are fed to a data compression ("speech encoding") and are stored in a non-volatile memory in order to provide the user with the updated status by reading it out;

the commands or names trained by the speaker are processed during the training phase in such a way that environmental noises are for the most part compensated during the recording;

If necessary, the completion of a recognition operation is optically or acoustically acknowledged ("beeping" sound or the like) or, alternatively (and if necessary only), the recognition result is repeated acoustically (speech output) for decisions relevant to safety, time, or costs, and that the user has the option of stopping the execution of the respective action through a speech command or by activating a switch (e.g., the escape key);

The speech dialogue system is connected to an optical display medium (LCD display, monitor, or the like), wherein the optical display medium can take over individual, several, or all of the following functions:

output of the recognized commands for control purposes;

display of the functions adjusted by the target device as reaction to the speech command;

display of various functions/alternatives, which are subsequently adjusted or selected or modified via speech command;

Each user can set upon his/her own name lists or abbreviation lists (comparable to a telephone directory or address book) wherein the name trained by the use on the speaker-dependent recognizer is associated with a number sequence, a letter sequence or a command or a command sequence, input in the speaker-independent operating mode;

in place of the renewed input of the number sequence, letter sequence, or command sequence, the user enters the list designation and the name selected by him/her, or a suitable command is entered in addition to the name, which suggests the correct list;

the list can be expanded at any time through additional entries by speech control;

the list can be deleted either completely or selectively by speech control;

the list can be listened to for a speech command, wherein the names entered by the user and, if necessary, the associated number sequence, letter sequence or commands can be output acoustically;

the acoustical output of the list can be terminated at any point in time;

A sequence of numbers (number column) can be spoken in either continuously (linked together) or in blocks wherein the SDS preferably exhibits one or more or all of the following characteristics:

an acknowledgement follows each input pause in that the last input block is repeated by the speech output;

following the acknowledgement through a command "error," "wrong," or the like, the last input block is deleted and the remaining, stored blocks are output acoustically;

following the acknowledgment through a command "delete" or a similar command input, all entered number blocks are deleted;

following the acknowledgment through a command "repeat" or the like, the blocks stored until then are output acoustically;

following the acknowledgment through a command "termination" or a similar command input, the input of the number column is terminated completely;

additional numbers or number blocks can be input following the acknowledgment;

the input of numbers is concluded with a suitable command following the acknowledgment;

the same blocking as for the input is used for the output of the numbers spoken in so far, which output follows the command "error" or the like or the command "repeat;"

A sequence of letters (letter column) is spoken in, which is provided for selecting complex functions or the input of a plurality of information bits, wherein the letter column is input in a linked form or in blocks and the SDS preferably exhibits one or several or all of the following characteristics:

an acknowledgment follows each input pause, in that the last input block is repeated by the speech output;

following the acknowledgment through a command "error," "wrong," or the like, the last input block is deleted and the remaining, stored blocks are output acoustically;

following the acknowledgment through a command "delete" or the like, all input letters are deleted and this is followed by a new input;

following the acknowledgment through a command "repeat" or the like, the blocks stored so far are output acoustically;

additional letters or letter blocks are input following the acknowledgment;

if necessary, the letter column is matched to a stored word list and the most suitable word(s) is (are) extracted from this; alternatively, this matching can already take place following the input of the individual letter blocks;

following the acknowledgment through a command "termination" or a similar command input, the input of the letter column is terminated completely;

the letter input is concluded with a suitable command following the acknowledgment.

The volume of the speech output and the "beep" sound must be adapted to the environmental noises, wherein the environmental noises are detected during the speaking pauses with respect to their strength and characteristic.

That access to the speech dialog system or access the user-specific data/commands is possible only after special key words or pass words have been input or after special key words or pass words have been entered by an authorized speaker whose speech characteristics are known to the dialog system and checked by the dialog system.

That speech outputs with a longer duration (e.g. information menus) can be terminated prematurely through spoken termination commands, or the PTT, or the escape key.

That the speech dialog system in one of the following forms either complements or replaces the manual operation of the above functions (e.g. via switch, key, rotary knob):

using the speech command does not replace any manual operation, but exists along with the manual operation (meaning the operation can at any time be performed or continued manually);

some special performance characteristics can be activated only via speech input, but that the essential device functions and operating functions continue to be controlled manually as well as by speech;

the number of manual operating elements is clearly reduced and individual keys or rotary knobs take over multiple functions; manual operating elements are assigned a special function by speech; only the essential operating functions can still be actuated manually; the operating functions are based, however, on the speech command control.

That a plurality of different devices as well as device functions can be made to respond and can be modified with a single multiword command, and an involved, multistage mode of action (e.g., selection of device in the first step, followed by selection of function in step 2, and subsequently selection of the type of change in step 3) is thus not required.

That the speech dialog system in the motor vehicle is used for one or several of the functions named in the following:

the operation of individual or several devices, e.g., a car telephone, car radio (if necessary with tape deck, CD changer, sound system), navigation system, emergency call, telematics services, onboard monitor, air-conditioning system, heating, travel computer, lighting, sun roof, window opener, seat adjuster, seat heater, rear-windshield heater, mirror adjuster and memory, seat adjuster and memory, steering wheel adjuster and memory, etc.;

information polling of parameters, e.g., oil pressure, oil temperature, cooling-water temperature, consumption, tire pressure, etc.;

information on measures required in special situations, e.g. if the cooling-water temperature is too high, the tire pressure is too low, etc.;

warning the driver of defects in the vehicle.

wherein the speech-controlled selection of a new station in the car radio preferably occurs in accordance with one of the following sequences:

issuing command for the search operation up or down;

speech input of the station frequency, preferably in the colloquial form (e.g. "one hundred three comma seven" or "hundred three comma seven," or including the frequency information (e.g. hundred three comma seven megahertz"));

That for the air-conditioning system, it is possible to set the desired temperature (if necessary staggered according to location in the passenger cell of the motor vehicle, divided into left, right, front, back) not only relatively, but preferably also absolutely (meaning as to degree, Fahrenheit, or the like) and that commands for a minimum, maximum, or average temperature or the normal temperature can additionally be issued; the operating states for the fan in the passenger space can be set in a similar way.

The navigation system is informed of a target location (location name, street name) by entering letter columns in the "spelling mode," wherein it is also sufficient to use the beginning of the name for the input and wherein the navigation system, if necessary, offers several candidates for selection.

One or several of the following, user-specific name lists are set up:

a list for storing telephone numbers under predetermined name/abbreviations;

a list for storing targets for the navigation system under predetermined names/abbreviations;

a list for storing function names for commands or command sequences;

a list for storing car radio station frequencies under station names or abbreviations that can be specified.

The output sound level of the speech output and the "beeping" sound, if necessary also the sound level of the radio, are set or adaptively adjusted by taking into account one or several of the following parameters:

the vehicle speed the rotational number the opening width for the window and the sun roof;

the fan setting;

the vehicle type;

the importance of the speech output in the respective dialog situation.

For one preferred embodiment of the described speech dialog system, it is provided, among other things, that executive sequence control, dialog control, interface control, speech input/output, as well as speech signal preprocessing, recognition, syntactical-grammatical and semantical post-processing are carried out with the aid of micro processors and signal processors, memories and interface modules, but preferably with a single digital signal processor or microprocessor, as well as the required external data memories and program memories, the interfaces and the associated driver modules, the clock generator, the control logic and the microphones and speakers, including the associated converters and amplifiers necessary for the speech input/output, as well as a push-to-talk (PTT) key and an escape key if necessary.

It is furthermore possible that with the aid of one or several interfaces:

data and/or parameters can be loaded or reloaded in order to realize, for example, process changes or a speech dialog system for another language:

the syntax structure, dialog structure, executive sequencing control, speech output etc., which are fixed or modified on a separate computer, are transferred to the speech dialog system ("off-line dialog editor");

the SDS can request and collect status information or diagnostic information;

the speech dialog system is linked via a bus system and/or a ring-shaped net with several of the devices to be actuated (in place of point-to-point connections to the individual devices) and that control data or audio signals or status information from the motor vehicle or the devices to be serviced are transmitted via this bus or the net;

the individual devices to be selected do not respectively comprise their own speech dialog system, but are serviced by a single (joint) speech dialog system;

one or several interfaces to vehicle components or vehicle computers exist, which are used to transmit information on permanent or actual vehicle data to the speech dialog system, e.g., speed, engine temperature, etc.;

the speech dialog system takes over other functions such as the radio, telephone, or the like during the waiting period (in which there is no speech input or output);

a multilingual, speaker-independent dialog system is set up with the aid of an expanded memory, which permits a quick switching between the dialog systems of various languages;

an optical display is coupled with the speech dialog system via a special interface or via the bus connection, wherein this bus preferably is an optical data bus and that control signals as well as audio signals can be transmitted via this bus;

It is understood that the invention is not limited to the embodiments and application examples shown here, but can be transferred to others in a corresponding way. Thus, it is conceivable, for example, that such a speech dialog system is used to operate an electronic dictionary or an electronic dictation or translation system.

One special embodiment of the invention consists in that for relatively limited applications with little syntax, the syntactical check is incorporated into the recognition process in the form of a syntactical bigram language model and the syntactical postprocessing can thus be eliminated;

for complex problem definitions, the interface between recognizer and postprocessing no longer consists of individual sentences, but a so-called "word hypotheses net," from which the most suitable sentence is extracted in a postprocessing stage and on the basis of predetermined syntactical values with special pairing strategies;

It is furthermore possible to provide an output unit (e.g. display) that operates on an optical basis as a complement or alternative to the speech output, which output unit displays the entered speech command, for example, in the form recognized by the SDS.

Finally, it is conceivable that the activated SDS can also be deactivated in that no new speech command is input by the user/speaker during a prolonged interval, which is either specified by the system or adaptively adjusted to the user/speaker.

| Abbreviations | |
|---|---|
| PTT | push-to-talk |
| HMM | Hidden Markov Models |
| DTW | dynamic time warping |
| CMF | cepstral vectors mean-value free |
| DCT | digital cosine transformation |
| FFT | Fast Fourier Transformation |
| LDA | linear discrimination analysis |
| PCM | pulse code modulation |
| VQ | vector quantization |
| SDS | speech dialog system |
| SBS | speech operating system |

What is claimed is:

1. A process for the automatic control of one or several devices by speech command or by speech dialog in real-time operation, wherein:

entered speech commands are recognized by a speaker-independent compound-word speech recognizer and a speaker-dependent speech recognizer and are classified according to their recognition probability; recognized, admissible speech commands are checked for their plausibility, and the admissible and plausible speech command with the highest recognition probability is identified as the entered speech command, and the functions assigned to this speech command of the device or devices or responses of the speech dialog system are initiated or generated; a process wherein:

one of the speech commands and the speech dialogs is formed or controlled, respectively on the basis of at least one syntax structure, at least one base command vocabulary and, if necessary, at least one speaker-specific additional command vocabulary;

the syntax structure and the base command vocabulary are provided in speaker-independent form and are fixed during real-time operation;

the speaker-specific additional command vocabulary or vocabularies are entered or changed by the respective speaker in that during training phases during or outside of the real-time operation, the speech recognizer that operates on the basis of a speaker-dependent recognition method is trained by the respective speaker through single or multiple input of the additional commands for the speech-specific features of the respective speaker;

in the real-time operation, the speech dialog or the control of the device or devices takes place as follows: speech commands spoken in by the respective speaker are transmitted to a speaker-independent compound-word recognizer operating on the basis of phonemes or whole-word models and to the speaker-dependent speech recognizer, where they are respectively subjected to a feature extraction and are examined and classified in the compound-word speech recognizer with the aid of the features extracted there to determine the existence of base commands from the respective base command vocabulary according to the respectively specified syntax structure, and are examined and classified in the speaker-dependent speech recognizer with the aid of the features extracted there to determine the existence of additional commands from the respective additional command vocabulary;

the commands that have been classified as recognized with a certain probability and the syntax structures of the two speech recognizers are then joined to form hypothetical speech commands, and that these are examined and classified according to the specified syntax structure as to their reliability and recognition probability;

the admissible hypothetical speech commands are subsequently examined as to their plausibility on the basis of predetermined criteria, and that among the hypothetical speech commands recognized as plausible, the one with the highest recognition probability is selected and is identified as the speech command entered by the respective speaker;

that subsequently a function or functions assigned to the identified speech command of the respective device to be controlled are initiated or a response or responses are generated in accordance with a specified speech dialog structure for continuing the speech dialog.

2. A process according to claim 1, characterized in that the input of speech commands occurs acoustically and preferably in the hands-off operation.

3. A process according to claim 2, characterized in that the acoustically input speech commands are transmitted noise-reduced to the two speech recognizers, in that noise signals, caused by stationary or quasi-stationary environmental noises, are compensated in the speech signal receiving channel in front of the two speech recognizers and preferably by means of adaptive digital filtering methods.

4. A process according to claim 2, characterized in that the acoustically input speech commands are transmitted echo-compensated to the two speech recognizers, in that signals of a speech or music output unit that are fed back into the speech signal receiving channel are compensated in the speech signal receiving channel in front of the two speech recognizers, in particular in front of the noise reduction unit, and preferably by means of adaptive digital filtering methods.

5. A process according to claim 1, characterized in that the entered speech commands initially are combined in blocks after digitizing, are converted to the frequency range following a weighting of a spectral transformation, preferably a Fast Fourier Transformation (FFT), and are subsequently combined to form channel vectors through sum formation and subsequent audio-related MEL filtering, and that this is followed by a segmentation.

6. A process according to claim 5, characterized in that the segmentation is divided into a rough and a precise segmentation.

7. A process according to claim 5, characterized in that feature extraction is carried out in the speaker-independent compound-word recognizer such that the channel vectors are transformed with a discrete cosine transformation (DCT) into cepstral vectors;

additionally the energy of the associated signal is calculated and standardized;

in order to adapt the recognizer to the respective speaker or the respective transmission characteristics of the speech signal receiving channel, the cepstral vector mean value is constantly computed and is subtracted from the cepstral vectors;

the cepstral vectors freed of the cepstral vector mean value and the computed, standardized signal energy are combined to form mean-value free cepstral coefficients (CMF vectors).

8. A process according to claim 5, characterized in that the speech dialog system in vehicles is used for individual or a plurality of the functions named in the following:

the operation of individual or multiple devices, e.g. car telephone, car radio (if necessary with tape deck, CD changer, sound system), navigation system, emergency call, onboard monitor, air-conditioning system, heater, travel computer, lighting, sun roof, window opener, seat adjuster;

information polling of parameters, e.g. oil pressure, oil temperature, cooling-water temperature, consumption, tire pressure;

information concerning necessary measures such as a cooling-water temperature that is too high, a tire pressure that is too low;

warning of the driver in case of vehicle malfunctions.

9. A process according to claim 8, characterized in that the speech controlled selection of a new station on the car radio occurs based on the following processes:

issuing a command for the search operation up or down;

speech input of the station frequency, preferably in the colloquial form, and preferably also including the frequency information;

speech input of the commonly used station name.

10. A process according to claim 8, characterized in that the desired temperature for the air-conditioning system can be set relatively and/or preferably absolutely through speech input, and that in addition, a command for a minimum, maximum, or average temperature or a normal temperature can preferably be issued.

11. A process according to claim 8, characterized in that a navigation system is informed of a target location (location name, street name) through the input of the letter columns in the "spelling mode," wherein the beginning of a name is preferably sufficient for the input and wherein the navigation system, if necessary, offers several candidates for selection.

12. A process according to claim 8, characterized in that one or several of the following, user-specific name lists are set up:

a list for storing telephone numbers under names/abbreviations that can be specified;

a list for storing targets for the navigation system under names/abbreviations that can be specified;

a list for storing function names for commands or command sequences;

a list for storing station frequencies for car radios under specifiable station names or abbreviations.

13. A process according to claim 8, characterized in that the volume for the speech output and the control sound or the control sounds, if necessary also the radio volume, are adaptively adjusted or set by taking into account one or several of the following parameters:

vehicle speed fan setting rotational number opening width for the window and sun roof vehicle type importance of the speech output in the respective dialog situation.

14. A process according to claim 1, characterized in that the speaker-independent compound-word recognizer uses Hidden Markov Models (HMM) based on phonemes or whole words for classification.

15. A process according to claim 14, characterized in that the classification is carried out with the aid of a Viterbi algorithm and that the Viterbi algorithm preferably is complemented by a specified word-sequence statistic.

16. A process according to claim 1, characterized in that for classification, filler words or filler phonemes or other faulty commands not included in a specified basic vocabulary are recognized as such, are correspondingly classified, and are separated out.

17. A process according to claim 1, characterized in that the speaker-independent compound-word speech recognizer and the speaker-dependent additional speech recognizer build onto the same signal preprocessing for the input speech commands, preferably including methods for noise reduction, echo compensation, and segmentation.

18. A process according to claim 1, characterized in that the additional speech recognizer operates as a single-word speech recognizer, preferably based on the dynamic time warping process.

19. A process according to claim 1, characterized in that the speaker-independent compound-word speech recognizer and the speaker-dependent speech recognizer operate jointly in the compound-word mode.

20. A process according to claim 1, characterized in that during real-time operation, there is a continuous adaptation of the speech signal receiving channel to the analog transmission characteristic, in particular to the characteristic for acoustic or microphone or amplifier and/or speaker.

21. A process according to claim 1, characterized in that the predetermined basic commands are specified and stored in speech-encoded form or the additional commands input by the respective speaker during the training phases or the speech commands input during the real-time operation are further processed in the speech-encoded form following their input or are stored in a non-volatile memory, and that encoded speech commands that must be output acoustically are speech-decoded prior to their output.

22. A process according claim 1, characterized in that the specified basic commands or the additional commands or the speech commands input during the real-time operation are stored in text form, and that speech commands that must be output acoustically are subjected to a text-to-language synthesis prior to their output.

23. A process according to claim 1, characterized in that the syntax structure and the speaker-independent commands are created and fixed ahead of time in the "off-line dialog editor mode" in the laboratory and are transmitted to the compound-word speech recognizer in the form of data files.

24. A process according to claim 1, characterized in that
 the word order in the speech commands can be changed by exchanging the individual words in a command or
 specified synonymous words can be used for generating the speech command or
 the same function can be realized through speech commands with a varying number of words.

25. A process according to claim 1, characterized in that for the recognition and subsequent separating out of insertions or other commands not belonging to the vocabulary, additional words or phonemes are added to the admissible vocabulary or that word spotting approaches are used.

26. A process according to claim 1, characterized in that the dialog structure has the following features:
 a flat hierarchy with only a few hierarchy levels, preferably one or two hierarchy levels,
 integration of ellipses for the processing of the speech dialog;
 including of auxiliary and information menus;
 including of repetition requests from the speech dialog system in case of unsure decisions by the recognizer
 including of speech outputs, in order to increase the recognition certainty by stimulating certain manners of speech.

27. A process according to claim 1, characterized in that the speech recognition or the speech dialog for the control of one or several device functions is preferably activated by a one-time actuation of a push-to-talk key (PTT) and that this activation is preferably acknowledged acoustically or optically.

28. A process according to claim 27, characterized in that the activation is terminated automatically if no speech input has occurred, following a time interval that can be specified or adaptively adjusted to the respective user, or following a repetition request by the speech dialog system, or if the dialog selected by the user has been completed according to plan.

29. A process according to the claim 27, characterized in that the push-to-talk key either makes use of or contains multifunctions, e.g. when using the telephone ("replace receiver," "lift off receiver") or for the restart of the speech dialog system or when terminating the telephone dialing operation;
 or is complemented by an additional switch or an additional switching position that permits, for example a restart of the speech dialog system or when terminating the telephone dialing operation.

30. A process according to claim 1, characterized in that the speech dialog or the input of speech commands can be terminated through the input of a specified, special termination speech command at defined locations in the speech dialog or at any time by actuating a key, preferably a push-to-talk key or an escape key.

31. A process according to claim 1, characterized in that the speech dialog system has at least one of the following performance characteristics:
 the specific (e.g. trained) speech commands from various speakers are stored, if necessary, for a later reuse;
 speech commands or names trained by the speaker are not only transmitted to the recognition system during a training phase, but are also recorded as to their time history, are transmitted to a data compression ("speech encoding"), and are stored in a non-volatile memory;
 speech commands trained by the speaker are processed during the training phase such that environmental noises are for the most part compensated during the recording.

32. A process according to claim 1, characterized in that the completion of a recognition operation is acknowledged acoustically with a control sound.

33. A process according to claim 1, characterized in that a recognition result is acoustically repeated (speech output), especially for decisions involving safety, item, or cost and that the speaker is given the option of preventing or reversing the carrying out of the function assigned to the speech command with the aid of a speech command or by actuating a switch, preferably a push-to-talk key or an escape key.

34. A process according to claim 1, characterized in that the speech dialog system is connected to an optical display medium, preferably a LCD display or a monitor or a display for a selected device.

35. A process according to claim 34, characterized in that the optical display medium takes over individual or a plurality of the following functions:
 output of the recognized speech command for control purposes;
 illustration of the functions adjusted by the target device in reaction to the speech command;
 illustration of various functions/alternatives, which are subsequently adjusted or selected or modified by speech command.

36. A process according to claim 1, characterized in that each speaker can set up his/her own name or abbreviation lists, comprising at least one of the following features:
 the name trained by the speaker on the speaker-dependent recognizer represents a number sequence, a letter sequence and/or a command or a command sequence, input in the speaker-independent operating mode;
 the user can input the list designation and the name selected by the user in place of the renewed input of the number sequence, letter sequence or command sequence, or the user can input a suitable command in addition to the name, which suggests the correct list;
 the list can be expanded at any time by speech control to comprise further entries;
 the list can be deleted completely or selectively with speech control;
 the list can be listened to for a speech command, wherein the names input by the user and, if necessary, the associated number sequence, letter sequence or commands can be output acoustically;
 the acoustic output of the list be terminated at any point in time.

37. A process according to claim 1, characterized in that a sequence of numbers (number column) can be spoken in either in a linked form or in blocks, wherein the speech input or the speech dialog exhibits at least one of the following features:

each input pause is followed by an acknowledgment in which the last input block if repeated by the speech output;

following the acknowledgment through a speech command "error" or the like, the last input block is deleted and the remaining, stored blocks are acoustically output;

following the acknowledgment through a speech command "delete" or the like, all entered number blocks are deleted;

following the acknowledgment through a speech command "repeat" or the like, the blocks stored until then are output acoustically;

following the acknowledgment through a speech command "termination" or the like, the input of the number column is terminated completely;

additional numbers or number blocks can be input following the acknowledgment;

following the acknowledgement, the number input is ended with a suitable speech command "stop," "store," or the like;

the input is completed by entering a speech command starting an action/function, e.g. "select" or the like, which initiates the action/function associated with the speech command.

38. A process according to claim 37, characterized in that the same blocking as for the input is used for the output of the numbers entered until then, which output follows the speech command "error" or the like or the speech command "repeat" or the like.

39. A process according to claim 1, characterized in that a sequence of letters (letter column) is spoken in, which is provided for the selection of complex functions or the input of a plurality of information bits, wherein the letter column is entered either linked together or in blocks and the speech input or the speech dialog exhibits at lease one of the following features:

each input pause is followed by an acknowledgement, in which the last input block is repeated by the speech output;

following the acknowledgment through a speech command "error" or the like, the last input block is deleted and the remaining, stored blocks are output acoustically;

following the acknowledgment through a speech command "delete" and the like, all previously entered letters are deleted and a new input can subsequently take place;

following the acknowledgement through a speech command "repeat" or the like, the blocks stored until then are output acoustically;

following the acknowledgment, additional letters or letter blocks can be input;

if necessary, the letter column or the individual letter blocks are matched with a stored word list, and the most suitable word(s) is (are) extracted from this;

following the acknowledgment through a speech command "termination" or the like, the input of the letter column is terminated completely;

following the acknowledgment, the letter input is completed with a speech command "stop," "store," or the like;

the input is completed by entering a speech command starting an action/function, such as "select" or the like, and the action/function associated with the speech command is initiated.

40. A process according to claim 1, characterized in that the speech output volume and the control sound volume are adapted to the environmental noises, wherein the environmental noises are detected during the speaking pauses with respect to the strength and characteristic.

41. A process according to claim 1, characterized in that access to the speech dialog system or access to user-specific data/commands can be gained only through the input of special command words or the input of special command words from an authorized speaker, whose speech characteristics are known to the speech dialog system and rare analyzed by this system.

42. A process according to claim 1, characterized in that speech output operations of a longer duration (e.g. information menus) can be terminated prematurely through spoken or manual termination commands.

43. A process according to claim 1, characterized in that the speech dialog system in one of the following forms complements or replaces the manual operation of the above functions (e.g. by switch, key, rotary button):

the speech command control exists in addition to the manual operation, so that it is possible at any time to have a manual operation or to continue the operation manually;

some special performance characteristics can be activated only by speech input, while other device functions and operating functions continue to be controlled manually as well as by speech;

the number of manual operating elements is clearly reduced, and individual keys or rotary knobs take over multiple functions; manual operating element are assigned a special function by each language; only the essential operating functions can still be actuated manually; the speech command control forms the basis for the operating functions.

44. A process according to claim 1, characterized in that a plurality of different devices as well as device functions can be addressed and modified with a single one-word or multiword command, and a multistage action is therefore not required at all or only to some degree.

45. An apparatus for the automatic control of one or several devices by speech commands or by speech dialog in real-time operation, wherein the entered speech commands are recognized by a speaker-independent compound-word speech recognizer and a speaker-dependent speech recognizer and are classified according to their recognition probability, recognized, admissible speech commands are checked for their plausibility, the admissible and plausible speech command with the highest recognition probability is identified as the entered speech command, and the functions associated with the identified speech command for the device or devices, or the responses of the speech dialog system are initiated or generated; with the apparatus including a voice input/output unit that is connected via a speech signal preprocessing unit with a speech recognition unit, which in turn is connected to a sequencing control, a dialog control, and an interface control, and wherein the speech recognition unit consists of a speaker independent compound-word recognizer and a speaker-dependent additional speech recognizer, which are both connected on the output side with a unit for combined syntactical-grammatical or semantical post processing, with said unit being linked to the sequencing control, the dialog control, and the interface control.

46. An apparatus according to claim 45, characterized in that the speech signal preprocessing unit includes a noise reduction device and/or an echo compensation device and/or a segmenting device.

47. An apparatus according to claim 45, characterized in that the speech input/output unit includes a speech encoder, a speech decoder, as well as a speech memory.

48. An apparatus according to claim 45, characterized in that the sequencing control, the dialog control, and the interface control, the speech input/output, as well as the speech signal preprocessing, the speech recognition, the syntactical-grammatical and semantical postprocessing are carried out with microprocessors and signal processors, memories, and interface modules, but preferably with a single digital signal processor or microprocessor as well as the required external memories for data and programs, the interfaces, as well as the associated driver modules, a clock generator, a control logic, and the microphones and speakers necessary for the speech input/output, including the associated converters and amplifiers, as well as a push-to-talk (PTT) key and an escape key if necessary.

49. An apparatus according to claim 48, characterized in that with the aid of one or several interfaces, data and/or parameters can be loaded or reloaded, e.g. to realize processing changes or a speech dialog system for another language;

the syntax structure, dialog structure, sequencing control, speech output, etc., which are fixed or modified on a separate computer, are transmitted to the speech dialog system ("off-line dialog editor");

diagnostic and status information can be requested and collected by the speech dialog system.

50. An apparatus according to claim 48, characterized in that this apparatus is linked via a bus system or a ring-shaped net with several devices to be controlled, and that control data and/or audio signals and/or status reports of the speech dialog system and/or the devices to be operated can be transmitted via this bus or the net.

51. An apparatus according to claim 50, characterized in that this bus or this net is an optical data bus, and that control signals as well as audio signals or status reports from the speech dialog system and the devices to be operated are transmitted via this data bus or net.

52. An apparatus according to claim 45 for use in vehicles, characterized in that the individual devices to be selected do not contain a separate speech dialog system each, but are operated with the aid of a single, joint speech dialog system.

53. An apparatus according to claim 45, characterized by the existence of one or several interfaces to vehicle components or vehicle computers, which are used to provide the speech dialog system with permanent or up-to-date vehicle data, e.g., the speed.

54. An apparatus according to claim 45 characterized in that this apparatus takes on other functions, e.g. for the radio, telephone, etc., during the waiting periods in which no speech input or speech output occurs.

55. An apparatus according claim 45, characterized in that a multilingual, speaker-independent dialog system is realized by means of an expanded memory, which permits the switching between the dialog systems of various languages.

56. An apparatus according to claim 45, characterized in that an optical display is coupled to the speech dialog system via a special interface or via the bus connection.

57. An apparatus according to claim 45, characterized in that the complete speech dialog system is coupled via a PCMCIA interface with the speech-controlled or speech-operated device or with a host computer or an application computer.

* * * * *